(12) United States Patent
Yu (10) Patent No.: US 10,192,060 B2
(45) Date of Patent: Jan. 29, 2019

(54) DISPLAY CONTROL METHOD AND APPARATUS AND DISPLAY DEVICE COMPRISING SAME

(71) Applicant: Beijing Zhigu Rui Tuo Tech Co., Ltd, Beijing (CN)

(72) Inventor: Kuifei Yu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 87 days.

(21) Appl. No.: 14/779,315

(22) PCT Filed: Dec. 10, 2013

(86) PCT No.: PCT/CN2013/088929
§ 371 (c)(1),
(2) Date: Nov. 18, 2015

(87) PCT Pub. No.: WO2014/206017
PCT Pub. Date: Dec. 31, 2014

(65) Prior Publication Data
US 2016/0171220 A1    Jun. 16, 2016

(30) Foreign Application Priority Data
Jun. 28, 2013  (CN) .......................... 2013 1 0269118

(51) Int. Cl.
*G06F 21/31*  (2013.01)
*G06F 21/60*  (2013.01)
(Continued)

(52) U.S. Cl.
CPC .............. *G06F 21/60* (2013.01); *G06F 3/048* (2013.01); *G06F 3/1454* (2013.01); *G06F 21/31* (2013.01);
(Continued)

(58) Field of Classification Search
CPC ........... G06F 21/60; G06F 21/32; G06F 21/31
See application file for complete search history.

(56) References Cited

U.S. PATENT DOCUMENTS

| 8,896,632 B2 | 11/2014 | MacDougall et al. |
| 2005/0057491 A1* | 3/2005 | Zacks ..................... G06F 21/84 |
| | | 345/156 |

(Continued)

FOREIGN PATENT DOCUMENTS

| CN | 1591353 | 3/2005 |
| CN | 1905580 A | 1/2007 |

(Continued)

OTHER PUBLICATIONS

International Search Report dated Apr. 3, 2014 for PCT Application No. PCT/CN2013/088929, 4 pages.

*Primary Examiner* — David J Pearson
(74) *Attorney, Agent, or Firm* — Amin, Turocy & Watson, LLP (57) ABSTRACT

A display control method and apparatus, and a display device comprising the apparatus, are provided. A method comprises receiving a display request sent by at least one source device, and performing directed display according to a posture of the source device. Directed display of content to be displayed can be performed according to a posture of a source device, so as to implement flexible large-screen sharing with ensured privacy and security.

39 Claims, 2 Drawing Sheets

(51) Int. Cl.
*G06F 3/048* (2013.01)
*H04N 5/445* (2011.01)
*H04N 21/41* (2011.01)
*H04N 21/414* (2011.01)
*H04N 21/422* (2011.01)
*H04N 21/4223* (2011.01)
*H04N 21/431* (2011.01)
*H04N 21/441* (2011.01)
*H04N 21/442* (2011.01)
*H04N 21/45* (2011.01)
*G06F 3/14* (2006.01)
*G06F 21/84* (2013.01)
*H04N 5/44* (2011.01)
*H04N 21/4788* (2011.01)

(52) U.S. Cl.
CPC ............ *G06F 21/84* (2013.01); *H04N 5/445* (2013.01); *H04N 21/4122* (2013.01); *H04N 21/41407* (2013.01); *H04N 21/4223* (2013.01); *H04N 21/42203* (2013.01); *H04N 21/431* (2013.01); *H04N 21/441* (2013.01); *H04N 21/44218* (2013.01); *H04N 21/4532* (2013.01); *H04N 21/4788* (2013.01); *H04N 2005/4442* (2013.01)

(56) References Cited

U.S. PATENT DOCUMENTS

| | | |
|---|---|---|
| 2006/0055678 A1 | 3/2006 | Kleihorst et al. |
| 2009/0167737 A1 | 7/2009 | Chen et al. |
| 2009/0267867 A1* | 10/2009 | Gonia ............... G06F 3/1454 345/1.1 |
| 2011/0080426 A1* | 4/2011 | Nakamori ........... G06F 21/6218 345/634 |
| 2011/0157264 A1* | 6/2011 | Seshadri ................. G06F 3/14 345/698 |
| 2011/0211739 A1* | 9/2011 | Eckhoff ................ G06Q 30/02 382/118 |
| 2011/0309946 A1* | 12/2011 | Jonsson ............ H04M 1/72563 340/686.6 |
| 2012/0066705 A1* | 3/2012 | Harada ............ H04N 21/42201 725/12 |
| 2012/0208466 A1* | 8/2012 | Park ...................... G06F 1/1601 455/41.3 |
| 2013/0057573 A1 | 3/2013 | Chakravarthula et al. |
| 2013/0091582 A1* | 4/2013 | Chen ..................... G06Q 10/10 726/26 |
| 2013/0103943 A1* | 4/2013 | Hirsch .................... G09C 5/00 713/168 |

FOREIGN PATENT DOCUMENTS

| | | |
|---|---|---|
| CN | 102203850 A | 9/2011 |
| CN | 102419680 A | 4/2012 |
| CN | 102473264 A | 5/2012 |
| CN | 102487393 A | 6/2012 |
| CN | 101488326 B | 8/2012 |
| CN | 101399025 B | 12/2012 |
| CN | 202878841 U | 4/2013 |
| CN | 103365657 A | 10/2013 |
| JP | 2006277342 A | 10/2006 |
| JP | 2007150866 A | 6/2007 |
| JP | 2010151951 A | 7/2010 |

* cited by examiner

DISPLAY CONTROL METHOD AND APPARATUS AND DISPLAY DEVICE COMPRISING SAME

RELATED APPLICATION

The present application is a U.S. National Stage filing under 35 U.S.C. § 371 of, and claims priority to, international Patent Cooperation Treaty (PCT) application No. PCT/CN2013/088929, filed Dec. 10, 2013, and entitled "DISPLAY CONTROL METHOD AND APPARATUS AND DISPLAY DEVICE COMPRISING SAME," which claims priority to Chinese Patent Application No. 201310269118.X, filed with the Chinese Patent Office on Jun. 28, 2013 and entitled "DISPLAY CONTROL METHOD AND APPARATUS, AND DISPLAY DEVICE COMPRISING THE APPARATUS", which applications are hereby incorporated herein by reference in their respective entireties.

TECHNICAL FIELD

The present application relates to the field of display control technologies, and in particular, to a display control method and apparatus, and a display device comprising the apparatus.

BACKGROUND

With the increasing demand of users for rich visual interaction, a large-size screen (large screen for short below) has found increasingly wide use. The large-size screen herein may be a display device that can display different content in different areas, and may also be a display device that can simultaneously display different content for different receivers. The arrangement of both a large screen arranged fixedly and a movable large screen in a scenario such as a home, an office, and a public place can meet watching demand at any time and any place of users. With the development of large screen technologies, 2D display, 3D display, interaction performance, and the like, on a large screen are enhanced. Particularly, in terms of user interaction, a large screen can achieve interaction for users possessing various mobile devices (comprising a mobile phone, a portable notebook, a wearable device, and the like). When a screen of a mobile device of a user cannot provide optimal experience for the user, or the mobile device of the user cannot provide visual interaction for the user, the user may project content that the user is to watch on a large screen arranged nearby, so as to implement sharing between the mobile device and the large screen, thereby meeting the demand of the user for visual interaction. However, security and privacy concerns of large-screen sharing (especially a large screen in a public place) become issues that constrain the rapid development and wide use of large screen technologies and require an urgent solution.

SUMMARY

An example, non-limiting objective of the present application is to provide a display control method and apparatus, and a display device comprising the apparatus, so as to implement flexible large-screen sharing with ensured privacy and security.

To these and/or related ends, in a first embodiment, an embodiment of the present application provides a display control method, and the method comprising:

receiving a display request sent by at least one source device; and performing directed display according to a posture of the source device.

In a second embodiment, an embodiment of the present application provides a display control apparatus, and the apparatus comprising:

a receiving module, configured to receive a display request sent by at least one source device; and a display control module, configured to perform directed display according to a posture of the source device.

In a third embodiment, an embodiment of the present application provides a display device comprising the display control apparatus in the second aspect or any possible implementation manner of the second aspect.

In a fourth embodiment, an embodiment of the present application provides a computer program product, and the computer program product causes a display control apparatus to execute the method in the first aspect or any possible implementation manner of the first aspect.

In a fifth embodiment, an embodiment of the present application provides a computer readable medium, the computer readable medium comprises a computer operation instruction, and when a processor executes the computer operation instruction, the computer operation instruction is used to cause the processor to execute the method in the first aspect or any possible implementation manner of the first aspect.

In a sixth embodiment, an embodiment of the present application provides a display control apparatus, and the apparatus comprises a processor, a memory, and a communications interface, the memory stores a computer operation instruction, the processor, the memory, and the communications interface are connected through a communications bus, and when the apparatus is operated, the processor executes the computer operation instruction stored in the memory, so as to cause the apparatus to execute the method in the first aspect or any possible implementation manner of the first aspect.

For the method, apparatus, and device according to the present application, directed display of content to be displayed can be performed according to a posture of a source device, so as to implement flexible large-screen sharing with ensured privacy and security.

DETAILED DESCRIPTION

Specific implementation manners of the present application are further described in detail with reference to accompanying drawings and embodiments. The following embodiments are used to describe the present application, but are not intended to limit the scope of the present application.

Figure 1:
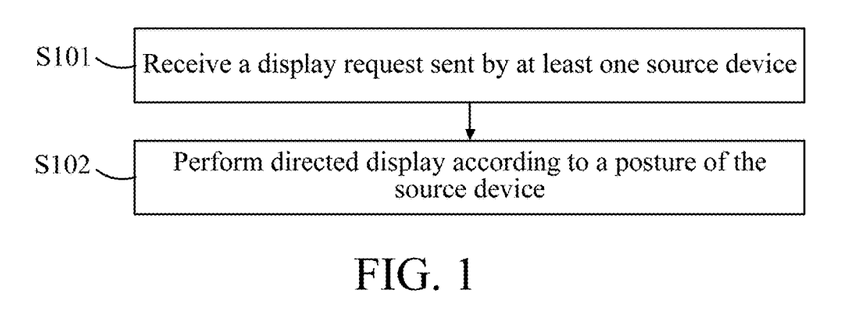
FIG. 1 is an example flowchart of a display control method according to an embodiment of the present application.

As shown in FIG. 1, a display control method according to an embodiment of the present application comprises the following steps:

S101. Receive a display request sent by at least one source device.

When a user needs to project content on a device possessed by the user onto a large screen and display the content in a specific direction, the user can send a display request to the large screen and the large screen receives the display request.

S102. Perform directed display according to a posture of the source device.

After the large screen receives the display request sent by the user, an authorized user is allowed to use a specific area on the large screen to perform directed display of corresponding content in a specific direction, so as to implement flexible content sharing with ensured privacy and security for the user. A target of the directed display is selected according to the posture of the source device.

In conclusion, in the method according to the embodiment of the present application, directed display of content to be displayed is performed according to a posture of a source device, so as to implement flexible large-screen sharing with ensured privacy and security.

The method according to the embodiment of the present application further comprises a step of authenticating a possessor of a source device to ensure security of displayed content. To authenticate a possessor of a source device, personal information of the possessor of the source device further needs to be obtained. Specifically, the method according to the embodiment of the present application further comprises the following steps:

S103. Obtain the personal information of the possessor of the source device.

S104. Authorize, according to the personal information of the possessor of the source device, use by the possessor of the source device, and allocate a display area to the possessor.

The personal information of the user may comprise one or more of a user name, a password, a name, a gender, an age, an occupation, a nationality, a nation, biological feature information (such as a fingerprint, a vein, a palm shape, a retina, an iris, a body smell, a voice, a facial shape, even a vessel, DNA, a bone, etc), and the like. The personal information may be obtained locally and/or from a remote end, and may also be obtained through real time collection. The personal information may also be comprised in the display request sent to the large screen. Authentication on the possessor of the source device may be performed by a third party, and may also be performed locally at the large screen, so as to verify whether the possessor of the source device is permitted to use the large screen, and allocate a proper display area to the user. The display area may be allocated according to the demand of displayed content, and may also be allocated according to a current use state of the large screen, which is not limited in the technical solution of the present application. Preferably, if the large screen can recognize that the possessor of the source device is a history user of the large screen, the large screen may also directly authorize use of the large screen by the possessor and allocate a display area according to a history use record.

In addition, to implement directed display according to the posture of the source device in the method according to the embodiment of the present application, the method according to the embodiment of the present application further comprises the following step:

S105. Obtain posture information of the source device.

Specifically, one or more of image information, gravity sensing information, acceleration (comprising linear acceleration and angular acceleration) information, and location (east, south, west, north, and the like) information are obtained. The obtained information is analyzed and determined to further obtain the posture information of the source device.

In the method according to the embodiment of the present application, the posture may refer to a facing direction of a screen of the source device. In this way, by determining the facing direction of the screen of the source device, how the possessor of the source device wants to use the allocated display area, that is, to which user content is to be displayed, can be determined. Definitely, the possessor of the source device may also be comprised as one user to which the content is to be displayed.

In addition, in the method according to the embodiment of the present application, when directed display of the displayed content is performed according to the posture of the source device, directed display may further be performed to a user having a specific relationship with the possessor of the source device. When directed display of the displayed content is performed according to the posture of the source device, it may be further detected in real time whether another user or another device enters a preset space range. The preset space range may be a display range of the whole large screen, a display range of the specific area allocated to the possessor of the source device, or the like. It may be further detected in real time whether another user or another device enters within a preset time range. The preset time range may be a certain period of time after directed display starts to be performed to the possessor of the source device, a certain period of time after directed display to the possessor of the source device is stopped, a time range set by the possessor of the source device, or the like. Specifically, the method according to the embodiment of the present application further comprises the following steps:

S106. Obtain social relationship information of the possessor of the source device.

S107. Perform directed display in another direction according to a social relationship of the possessor of the source device.

The social relationship information is information, of a group associated with the user to some extent, that can be obtained locally and/or from a remote end (comprising a user equipment, a social network, and the like) according to the personal information of the user and/or a device identifier of the user. The social relationship information comprises one or more of relative information of the user, friend information of the user, colleague information of the user, information about a friend circle (such as QQ friends, WeChat friends) in a social network of the user, social information of displayed content displayed by the user on the large screen, and the like. The social information of displayed content refers to that the displayed content was or is being shared by the user with another user in the social network, or the like.

In the method according to the embodiment of the present application, both social relationships of the possessor of the source device and another user may be obtained according to personal information of a user or may be obtained according to a device identifier of a corresponding device. To improve accuracy of obtained information, corresponding social relationship information may be obtained by combining both personal information of a user and a device identifier of a user equipment. In the method according to the embodiment of the present application, a device identifier may be comprised in a display request, and may also be obtained in real time in a manner of near field communication (NFC) and the like.

In addition, Step S107 specifically comprises:

S1071. When it is detected that another user appears within the preset time and/or space range, obtain personal information of the other user.

S1072. Perform directed display to at least one user having a social relationship with the possessor of the source device.

Alternatively, step S107 may further comprise:

S1073. When it is detected that another device appears within the preset time and/or space range, obtain, according to an identifier of the other device, social relationship information of a corresponding user.

S1074. Perform directed display to at least one user having a social relationship with the possessor of the source device.

The step of performing directed display to at least one user having a social relationship with the possessor of the source device may be implemented through the following steps:

S1075. Position at least one user having a social relationship with the possessor of the source device.

The positioning at least one user having a social relationship with the possessor of the source device may be implemented by recognizing a biological feature, such as a face, a pupil, and a voice, of the user.

S1076. Perform directed display, according to a positioning result, to at least one user having a social relationship with the possessor of the source device.

The step of performing directed display to at least one user having a social relationship with the possessor of the source device may further be implemented through the following steps:

S1077. Position the other device.

The positioning the other device may be implemented by means of GPS positioning, NFC or the like.

S1078. Perform directed display, according to a positioning result, to the other device.

It should be noted that in the method according to the embodiment of the present application, directed display according to a positioning result is not limited to directed display to a positioned target only, and the positioned target may further be used as a reference for directed display. For example, in a case in which a device is used as a positioned target, a target of directed display may be set as a certain range with the positioned device as the center, so as to implement more effective directed display to the possessor of the device. In addition, directed display may also be implemented by various means; for example, a viewing angle of the display area allocated to the possessor of the source device is dynamically adjusted according to a location of the possessor of the device or a location of the device, which is not limited in the technical solutions of the present application.

In conclusion, in the method of the embodiment of the present application, when directed display is performed according to a posture of a source device, displayed content may further be shared according to a social relationship of the possessor of the source device, so as to implement flexible content sharing on a large screen for multiple users with privacy protection being implemented more effectively.

A person skilled in the art may understand that in the method provided in specific implementation manners of the present application, sequence numbers of all steps do not indicate an execution sequence, and the execution sequence of all steps should be determined by functions and internal logic of the steps; therefore, implementation processes of specific implementation manners of the present application are not limited in any way.

Figure 2:
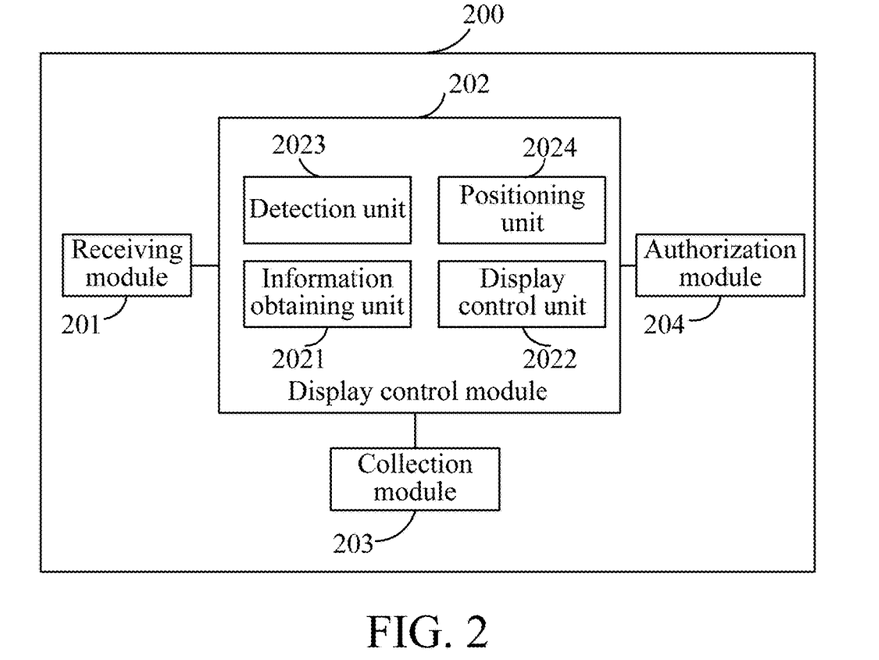
FIG. 2 is an example schematic structural diagram of a display control apparatus according to an embodiment of the present application.

As shown in FIG. 2, a display control apparatus 200 provided in an embodiment of the present application comprises a receiving module 201 and a display control module 202.

The receiving module 201 is configured to receive a display request sent by at least one source device.

When a user needs to project content on a device possessed by the user onto a large screen and display the content in a specific direction, the user can send a display request to the large screen and the large screen receives the display request.

The display control module 202 is configured to perform directed display according to a posture of the source device.

After the large screen receives the display request sent by the user, an authorized user is allowed to use a specific area on the large screen to perform directed display of corresponding content in a specific direction, so as to implement flexible content sharing with ensured privacy and security for the user. A target of the directed display is selected according to the posture of the source device.

In conclusion, the apparatus according to the embodiment of the present application performs directed display of content to be displayed according to a posture of a source device, so as to implement flexible large-screen sharing with ensured privacy and security.

In the apparatus according to the embodiment of the present application, a step of authenticating a possessor of a source device is further comprised to ensure security of displayed content. To authenticate a possessor of a source device, personal information of the possessor of the source device needs to be obtained. Specifically, the apparatus according to the embodiment of the present application further comprises a collection module 203 and an authorization module 204.

The collection module 203 is configured to obtain the personal information of the possessor of the source device.

The authorization module 204 is configured to authorize, according to the personal information of the possessor of the source device collected by the collection module 203, use by the possessor of the source device, and allocate a display area to the possessor.

The personal information may be obtained locally and/or from a remote end, and may also be obtained through real time collection. The personal information may also be comprised in the display request sent to the large screen. Authentication on the possessor of the source device may be performed by a third party, and may also be performed locally at the large screen, so as to verify whether the possessor of the source device is permitted to use the large screen, and allocate a proper display area to the user. The display area may be allocated according to the demand of displayed content, and may also be allocated according to a current use state of the large screen, which is not limited in the technical solution of the present application. Preferably, if the large screen can recognize that the possessor of the source device is a history user of the large screen, the large screen may also directly authorize use of the large screen by the possessor and allocate a display area according to a history use record.

Still, as shown in FIG. 2, to implement directed display according to the posture of the source device, the collection module 203 is further configured to obtain posture information of the source device. Specifically, one or more of image information, gravity sensing information, acceleration (comprising linear acceleration and angular acceleration) information, and location (east, south, west, north, and the like) information are obtained. The obtained information is analyzed and determined to further obtain the posture information of the source device.

In the apparatus according to the embodiment of the present application, the posture may refer to a facing direction of a screen of the source device. In this way, by determining the facing direction of the screen of the source device, how the possessor of the source device wants to use the allocated display area, that is, to which user content is to be displayed, can be determined. Definitely, the possessor of the source device may also be comprised as one user to which the content is to be displayed.

In addition, when directed display of the displayed content is performed according to the posture of the source device, the apparatus according to the embodiment of the present application may further perform directed display to a user having a specific relationship with the possessor of the source device. When directed display of the displayed content is performed according to the posture of the source device, it may be further detected in real time whether another user or another device enters a preset space range. The preset space range may be a display range of the whole large screen, a display range of the specific area allocated to the possessor of the source device, or the like. It may be further detected in real time whether another user or another device enters within a preset time range. The preset time range may be a certain period of time after directed display starts to be performed to the possessor of the source device, a certain period of time after directed display to the possessor of the source device is stopped, a time range set by the possessor of the source device, or the like. Specifically, the display control module 202 further comprises an information obtaining unit 2021 and a display control unit 2022.

The information obtaining unit 2021 is configured to obtain social relationship information of the possessor of the source device according to the personal information of the possessor of the source device. When the display request comprises an identifier of the source device, the information obtaining unit 2021 may be further configured to obtain the social relationship information of the possessor of the source device according to the identifier of the source device. Definitely, the information obtaining unit 2021 may further obtain the social relationship information of the possessor of the source device according to the identifier of the source device in combination with the personal information of the possessor of the source device.

The display control unit 2022 is configured to perform directed display in another direction according to a social relationship of the possessor of the source device.

In the apparatus according to the embodiment of the present application, both social relationships of the possessor of the source device and another user may be obtained according to personal information of a user or may be obtained according to a device identifier of a corresponding device. To improve accuracy of obtained information, corresponding social relationship information may be obtained by combining both personal information of a user and a device identifier of a user equipment. In the apparatus according to the embodiment of the present application, a device identifier may be comprised in a display request, and may also be obtained in real time in a manner of NFC or the like.

In addition, the display control module 202 further comprises a detection unit 2023.

The detection unit 2023 is configured to detect whether another user meeting a preset condition appears.

Correspondingly, the information obtaining unit 2021 is further configured to: when the detection unit 2023 detects that another user meeting a preset condition appears, obtain personal information of the other user. The display control unit 2022 performs directed display to at least one user having a social relationship with the possessor of the source device.

In another aspect, the detection unit 2023 may be further configured to detect whether another device meeting a preset condition appears. Correspondingly, the collection module 203 is further configured to: when the detection unit 2023 detects that another device meeting a preset condition appears, obtain, according to an identifier of the other device, social relationship information of a corresponding user. The display control unit 2022 performs directed display to at least one user having a social relationship with the possessor of the source device.

To implement directed display to a user having a social relationship with the possessor of the source device, the display control module 202 further comprises: a positioning unit 2024, configured to position the at least one user having a social relationship with the possessor of the source device. The positioning at least one user having a social relationship with the possessor of the source device may be implemented by recognizing a biological feature, such as a face, a pupil, and a voice, of the user. Correspondingly, the apparatus 200 according to the embodiment of the present application may comprise an image collection apparatus, a voice collection apparatus, and the like. The display control unit 2022 specifically performs directed display to a corresponding user according to a positioning result of the positioning unit 2024.

To implement directed display to a user having a social relationship with the possessor of the source device, the positioning unit 2024 may be further configured to position the other device. The positioning the other device may be implemented by means of GPS positioning, NFC or the like. The display control unit 2022 may further perform directed display to the source device according to a positioning result of the positioning unit.

It should be noted that in the apparatus according to the embodiment of the present application, directed display according to a positioning result is not limited to directed display to a positioned target only, and the positioned target may further be used as a reference for directed display. For example, in a case in which a device is used as a positioned target, a target of directed display may be set as a certain range with the positioned device as the center, so as to implement more effective directed display to the possessor of the device. In addition, directed display may also be implemented by various means; for example, a viewing angle of the display area allocated to the possessor of the source device is dynamically adjusted according to a location of the possessor of the device or a location of the device, which is not limited in the technical solutions of the present application.

Figure 3:
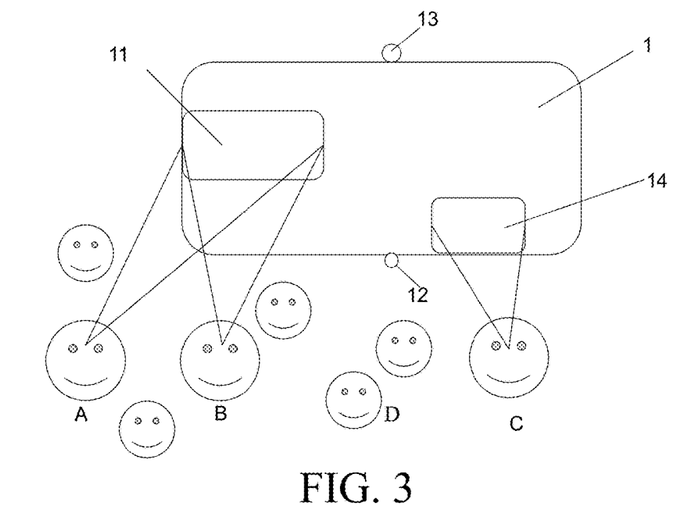
FIG. 3 is an example schematic diagram of an example of a display device according to an embodiment of the present application.

An embodiment of the present application further provides a display device comprising the foregoing display control apparatus. As shown in FIG. 3, the display device is a large-size screen 1 that can display in different areas and at multiple angles according to a user demand. According to the method of the embodiment of the present application, when a user A passes the large screen 1 comprising the display control apparatus of the embodiment of the present application and wants to project a video that the user watches on a mobile phone onto the large screen 1 for a better watching effect, the user A sends a display request to the large screen 1, wherein the display request comprises a mobile phone number of the user A. After receiving the display request, the large screen 1 sends a verification prompt to the user A. The user A inputs voice verification information by using a voice collection apparatus (Mic) of the large screen 1. The large screen 1 may further send a verification code to the user A through a mobile phone provider. After receiving the voice verification information input by the user A or the verification code returned by the user A, the large screen 1 verifies that the user A is valid, allocates an area 11 to the user A, and notifies the user A. After receiving a notification from the large screen 1, the user A sends the video to the large screen 1. The large screen 1 collects real time image information with a camera 13, obtains acceleration information, location information, and other information of the mobile phone from the mobile phone of the user A, determines, according to the information, a facing direction of the screen of the mobile phone of the user A, and dynamically adjusts an angle of the area 11 according to the direction. In this example, the screen of the mobile phone of the user A faces the user A. In this case, if the user A wants to share content of the video simultaneously with an accompanying friend B, the user A instructs B to enter a display range of the large screen 1. When detecting that a new user appears in the display range of the large screen 1, the large screen 1 collects image information of the new user with the camera 13 and recognizes the identity of the new user, meanwhile obtains address book information of the mobile phone of the user A according to the phone number of the user A, determines that the user B is a friend in the address book of the user A, and also performs directed display of the video shared by the user A to the user B. In addition, if the user A wants to share the video with another friend not accompanying the user A, the user A may send a timing display request to the large screen 1, for example, instruct the large screen 1 to share the content of the video according to a social relationship of the user A within future 24 hours. The large screen 1 stores the content of the video according to the request, and performs directed display of the video to a user that has a social relationship with the user A and appears in the display range of the large screen within 24 hours. Because the large screen 1 is a display device that displays in different areas and at multiple angles, during display, the large screen 1 further performs directed display to a user C in an area 14 according to a posture of a device of a user D.

Figure 4:
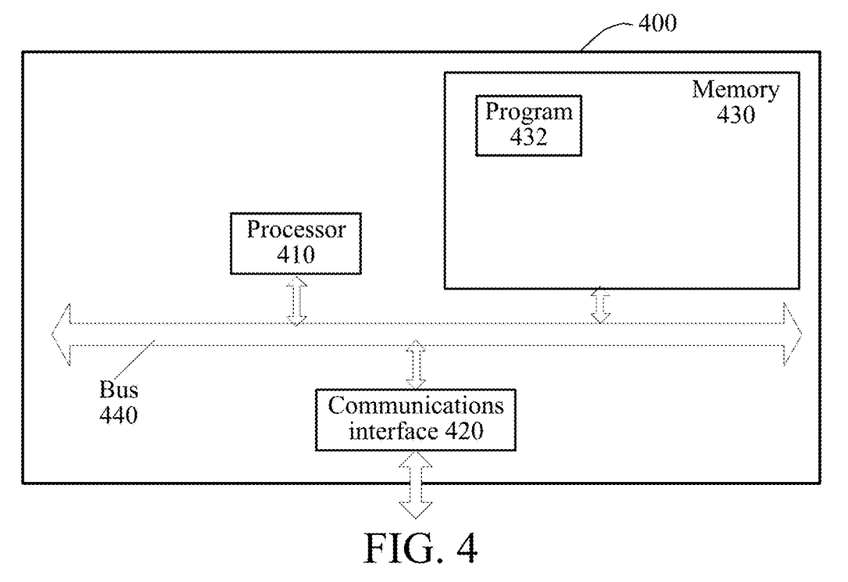
FIG. 4 is another example schematic structural diagram of a display control apparatus according to an embodiment of the present application.

Referring to FIG. 4, an embodiment of the present application provides another display control apparatus 400. A specific implementation of the display control apparatus 400 is not limited in a specific embodiment of the present application. As shown in FIG. 4, the device may comprise:

a processor 410, a communications interface 420, a memory 430, and a communications bus 440.

Communication among the processor 410, the communications interface 420, and the memory 430 is accomplished by using the communications bus 440.

The communications interface 420 is configured to communicate with a network element such as a client.

The processor 410 is configured to execute a program 432, and specifically may execute related steps in the method embodiment shown in FIG. 1.

Specifically, the program 432 may comprise program code, and the program code comprises a computer operation instruction.

The processor 410 may be a central processing unit (CPU), an application specific integrated circuit (ASIC) or one or more integrated circuits configured to implement the embodiment of the present application.

The memory 430 is configured to store the program 432. The memory 430 may comprise a high-speed random access memory (RAM) memory, and may also comprise a non-volatile memory, for example, at least one disk memory. The program 432 specifically may cause the apparatus 400 to execute the following steps:

receiving a display request sent by at least one source device; and performing directed display according to a posture of the source device.

For a specific implementation of each unit in the program 432, reference may be made to a corresponding step or unit in each embodiment herein, which is not elaborated herein.

A person of ordinary skill in the art may be aware that, the exemplary units and method steps described in the embodiments disclosed herein may be implemented by electronic hardware or a combination of computer software and electronic hardware. Whether the functions are performed in the form of hardware or software depends on particular applications and design constraint conditions of the technical solutions. A person skilled in the art may use different methods to implement the described functions for each particular application, but it should not be considered that the implementation goes beyond the scope of the present invention.

When the functions are implemented in a form of a software functional unit, and are sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a server, a network device or the like) to perform all or a part of the steps of the method described in the embodiment of the present application. The foregoing storage medium comprises any medium that can store program code, such as a USB flash drive, a removable hard disk, a read-only memory (ROM), a RAM, a magnetic disk or an optical disc.

The foregoing implementation manners are only used for describing the present application, and are not intended to limit the present application. A person of ordinary skill in the art may make various changes and variations without departing from the spirit and scope of the present application; therefore, any equivalent technical solution falls within the scope of the present application, and patent protection scope of the present application shall be defined by claims.

What is claimed is:

1. A method, comprising:
receiving, by a system comprising a processor and a display device, a display request sent by a source device of a first user, wherein the display device comprises a plurality of display areas, and wherein each angle of the plurality of display areas is adjustable;

determining a facing direction of a screen of the source device of the first user;

dynamically adjusting a first angle of a first defined display area corresponding to the source device according to the facing direction;

displaying content corresponding to the display request to the first user via the first defined display area;

obtaining a social relationship associated with an identity of the first user of the source device;

dynamically adjusting a second angle of a second defined display area corresponding to a second device of a second user having the social relationship with the first user of the source device; and displaying the content to the second user via the second defined display area.

2. The method of claim 1, further comprising:
obtaining posture information representing the posture of the source device.

3. The method of claim 2, wherein the obtaining the posture information comprises:
obtaining at least one of image information, gravity sensing information, acceleration information, or location information of the source device.

4. The method of claim 1, further comprising:
obtaining personal information relating to the identity of the first user of the source device.

5. The method of claim 4, further comprising:
authorizing, according to the personal information, use by the first user of the source device.

6. The method of claim 5, wherein the identity is a first identity, and wherein the displaying the content to the second user having the social relationship with the first user of the source device comprises:
in response to detecting that the second device meets a preset condition, obtaining, according to an identifier of the second device, social relationship information relating to a second identity of the second user of the second device; and
selecting the second defined display area based on the second viewing angle of the second device.

7. The method of claim 6, wherein the positioning of the second user is a first positioning, and wherein the displaying the content to the second user having the social relationship with the first user of the source device comprises:
determining a second positioning of the second device; and
performing the displaying the content via the second defined display area according to the second positioning.

8. The method of claim 4, further comprising:
obtaining social relationship information relating to the identity of the first user of the source device according to the personal information.

9. The method of claim 8, wherein the identity is a first identity, and wherein the displaying the content to the second user having the social relationship with the first user of the source device comprises:
in response to detecting that the second device meets a preset condition, performing the obtaining, according to an identifier of the second device, of the social relationship information relating to a second identity of the second user of the second device; and
selecting the second defined display area based on the second viewing angle of the second device.

10. The method of claim 4, wherein the display request comprises an identifier of the source device; and
wherein the method further comprises:
obtaining social relationship information relating to the identity of the first user of the source device according to the identifier of the source device.

11. The method of claim 4, wherein the display request comprises an identifier of the source device; and
wherein the method further comprises:
obtaining social relationship information relating to the identity of the first user of the source device according to the identifier of the source device and the personal information.

12. The method of claim 4, wherein the identity is a first identity, and wherein the displaying the content to the second user having the social relationship with the first user of the source device comprises:
in response to detecting that a second identity of the second user of the second device meets a preset condition, performing the obtaining of the personal information.

13. The method of claim 12, wherein the displaying the content to the second user having the social relationship with the first user of the source device comprises:
determining a positioning of the second user of the second device; and
displaying the content via the second defined display area according to the positioning.

14. The method of claim 13, wherein the determining the positioning of the second device comprises:
recognizing a face or a pupil of the second user of the second device.

15. The method of claim 12, wherein the preset condition is within a space range.

16. The method of claim 4, wherein the personal information of the first user comprises at least one of user name information, password information, name information, gender information, age information, occupation information, nationality information, nation information, or biological feature information.

17. The method of claim 1, wherein the displaying the content to the second user occurs for a defined time range, wherein the defined time range comprises a period of time after the displaying the content via the first defined display area, and wherein the period of time is either a first period of time after halting the displaying of the content via the first defined display area, or a second period of time configured for the source device based on input to the source device received from the first user.

18. The method of claim 1, wherein the first defined display area is allocated according to a demand for the content being displayed.

19. An apparatus, comprising:
a memory that stores executable modules;
a plurality of display areas, wherein respective angles of the plurality of display areas are adjustable; and
a processor, coupled to the memory, that executes the executable modules to perform operations of the apparatus, the executable modules comprising:
a receiving module configured to receive a display request sent by a source device of a first user;
a determining module configured to determine a facing direction of a screen of the source device of the first user and dynamically adjust a first angle of a first defined display area corresponding to the source device according to the facing direction;

a first display control module configured to perform a first directed display of content corresponding to the display request via the first defined display area;

a collection module configured to obtain a social relationship associated with an identity of the first user of the source device;

an adjusting module configured to dynamically adjust a second angle of a second defined display area corresponding to a second device of a second user having the social relationship with the first user of the source device; and a second display control module configured to perform a second directed display of the content to the second user via the second defined display area.

20. The apparatus of claim 19, wherein the apparatus further comprises:

a collection module configured to obtain posture information of the source device.

21. The apparatus of claim 20, wherein the collection module is configured to obtain one or more of image information, gravity sensing information, acceleration information, and location information of the source device.

22. The apparatus of claim 19, wherein the apparatus further comprises:

a collection module configured to obtain personal information of the first user of the source device.

23. The apparatus of claim 22, wherein the apparatus further comprises:

an authorization module configured to authorize, according to the personal information of the first user of the source device, use by the first user of the source device.

24. The apparatus of claim 23, wherein the first display control module further comprises:

an information obtaining unit configured to obtain social relationship information of the first user of the source device according to the personal information of the first user of the source device.

25. The apparatus of claim 23, wherein the display request comprises an identifier of the source device; and wherein the first display control module comprises:

an information obtaining unit configured to obtain social relationship information of the first user of the source device according to the identifier of the source device.

26. The apparatus of claim 23, wherein the display request comprises an identifier of the source device; and wherein the first display control module comprises:

an information obtaining unit configured to obtain social relationship information of the first user of the source device according to the identifier of the source device and the personal information of the first user of the source device.

27. The apparatus of claim 23, wherein the first display control module further comprises:

a detection unit configured to detect whether the second user of the second device meeting a preset condition has occurred; and wherein the collection module is further configured to: in response to the detection unit detecting that the second user of the second device satisfies the preset condition, obtain other personal information of the second user of the second device other than the personal information.

28. The apparatus of claim 27, wherein the first display control module further comprises:

a positioning unit configured to position the second user of the second device at a position; and wherein the second display control module comprises:

a display control unit configured to display the content on the second defined display area according to the position.

29. The apparatus of claim 28, wherein the positioning unit positions by recognizing a face or a pupil of the second user of the second device.

30. The apparatus of claim 23, wherein the first display control module further comprises:

a detection unit configured to detect whether the second device meeting a preset condition has occurred; and wherein the information obtaining unit is further configured to: in response to the detection unit detecting that the second device meeting the preset condition has occurred, obtain, according to an identifier of the second device, social relationship information of the second user of the second device.

31. The apparatus of claim 30, wherein the first display control module further comprises:

a positioning unit configured to position the second device at a position; and wherein the display control unit displays the content on the second defined display area according to the position.

32. The apparatus of claim 22, wherein the personal information is comprised in the display request sent by the source device.

33. The apparatus of claim 22, wherein the first display control module further comprises:

a positioning unit configured to position the second user of the second device at a position, wherein the positioning unit positions by alignment with a face or a pupil of the second user of the second device.

34. The apparatus of claim 19, wherein the apparatus is provided in a display device.

35. The apparatus of claim 19, wherein the displaying the content to the second user having the social relationship with the first user of the source device is performed for a period of time, wherein the time range comprises a period of time after the content is displayed on the first defined display area, and wherein the period of time starts after the content being displayed on the first defined display area has been stopped.

36. A computer readable storage device comprising executable instructions that, in response to execution, cause a system comprising a processor and coupled to a display device to perform operations, comprising:

receiving a display request from a source device of a first user;

determining a facing direction of a screen of the source device of the first user;

dynamically adjusting a first angle of a first defined display area corresponding to the source device according to the facing direction;

displaying content corresponding to the display request to the first user via the first defined display area;

obtaining a social relationship associated with an identity of the first user of the source device;

dynamically adjusting a second angle of a second defined display area corresponding to a second device of a second user having the social relationship with the first user of the source device; and displaying content to the second user via the second defined display area.

37. The computer readable storage device of claim 36, wherein the displaying the content to the second user having the social relationship with the first user of the source device is performed for a period of time, and wherein the defined time range is configurable by the first user of the source device.

38. An apparatus, comprising:
a plurality of display areas, wherein an angle of each of the plurality of display areas is adjustable;
means for receiving a display request sent by at least one source device of a first user;
means for determining a facing direction of a screen of the source device of the first user and for dynamically adjusting a first angle of a first defined display area corresponding to the source device according to the facing direction;
first means for displaying content corresponding to the display request via the first defined display area;
second means for obtaining a social relationship associated with an identity of the first user of the source device;
means for dynamically adjusting a second angle of a second defined display area corresponding to a second device of a second user having the social relationship with the first user of the source device; and
third means for displaying the content to the second user via the second defined display area.

39. The apparatus of claim 38, wherein the first defined display area is allocated according to a current use state of at least one of the plurality of display areas.

* * * * *